United States Patent
Flaten et al.

(10) Patent No.: US 7,469,597 B2
(45) Date of Patent: Dec. 30, 2008

(54) TRACER MEASUREMENT IN MULTIPHASE PIPELINES

(75) Inventors: Gunnar Flaten, His (NO); Terje Sira, Skedsmokorset (NO)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 11/722,309

(22) PCT Filed: Nov. 4, 2005

(86) PCT No.: PCT/NO2005/000421

§ 371 (c)(1),
(2), (4) Date: Aug. 14, 2007

(87) PCT Pub. No.: WO2006/068488

PCT Pub. Date: Jun. 29, 2007

(65) Prior Publication Data

US 2008/0092666 A1   Apr. 24, 2008

(30) Foreign Application Priority Data

Dec. 23, 2004   (NO) .................................. 20045642

(51) Int. Cl.
*G01F 1/704* (2006.01)
*G01F 1/74* (2006.01)
(52) U.S. Cl. .................................. 73/861.07; 73/861.04
(58) Field of Classification Search .. 73/861.04–861.07
See application file for complete search history.

(56) References Cited

U.S. PATENT DOCUMENTS

| | | | | | |
|---|---|---|---|---|---|
| 3,727,048 A | * | 4/1973 | Haas | ........................ | 73/861.07 |
| 4,153,418 A | * | 5/1979 | Haas | ........................ | 73/861.07 |
| 4,167,870 A | * | 9/1979 | Haas | ........................ | 73/861.04 |
| 5,182,939 A | * | 2/1993 | Chien et al. | ............... | 73/861.05 |
| 5,567,885 A | * | 10/1996 | Garside | ................... | 73/861.07 |
| 5,594,179 A | * | 1/1997 | Marsh | ....................... | 73/861.07 |
| 5,880,375 A | | 3/1999 | Bielski et al. | | |
| 7,047,830 B2 | * | 5/2006 | Bratton et al. | ............. | 73/865.8 |
| 7,207,228 B2 | * | 4/2007 | Wang | ....................... | 73/861.07 |
| 7,278,325 B2 | * | 10/2007 | Fraser et al. | ............. | 73/861.07 |

FOREIGN PATENT DOCUMENTS

| | | |
|---|---|---|
| GB | 2 362 220 | 11/2001 |
| WO | WO-01/81873 | 11/2001 |

* cited by examiner

*Primary Examiner*—Harshad Patel
(74) *Attorney, Agent, or Firm*—Foley & Lardner LLP

(57) ABSTRACT

The present invention relates to a method for measurement of total phase volumes in multiphase flow in pipelines. The multiphase fractions comprise hydrocarbon liquid phase and/or water phase and/or transported solid phases. One or more tracers are injected into the pipeline, preferably at the inlet and the tracer concentration(s) are measured as a function of time at the point of injection and at one or more points of measurements downstream from the point of injection. Further, the mean residence time(s) are measured for transport of the injected tracer(s) from the point of injection to said one or more point(s) measurements. The liquid phase volume(s) are calculated based on the amount of injected tracers and the measured tracer concentrations in each phase and the mean residence time.

9 Claims, 1 Drawing Sheet

US 7,469,597 B2

TRACER MEASUREMENT IN MULTIPHASE PIPELINES

TECHNICAL FIELD OF THE INVENTION

Figure 1:
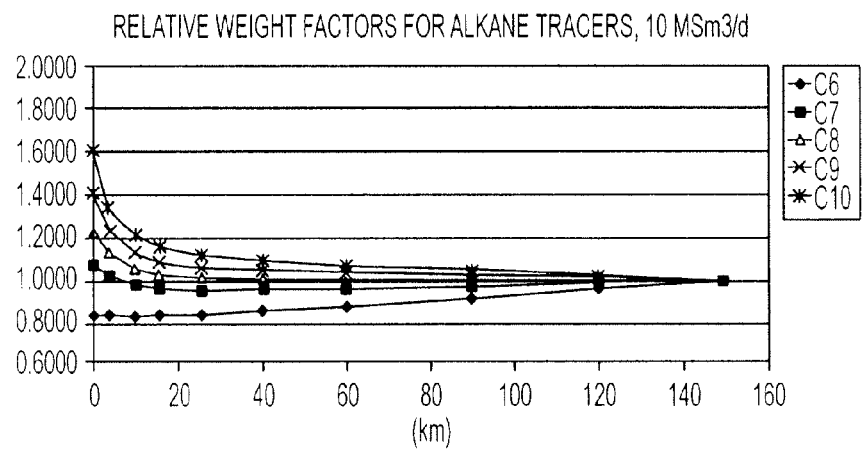

The technical field of the invention is multiphase flow in pipelines for example in the petroleum industry. The invention relates to a method for measurement of total phase volumes in multiphase flow in pipelines, the multiphase fractions comprising hydrocarbon liquid phase and/or gas phase and/or water phase and/or solid phases.

BACKGROUND OF THE INVENTION AND THE STATE OF THE ART

For design and operation of multiphase pipelines the knowledge of the volume of the liquid phases may be crucial for estimating the pressure drop in the lines and for design and operation of the multiphase line and the receiving facilities. Especially for gas condensate pipelines, where the liquid content in the line may depend strongly on the flow rate, the pipeline diameter selection, the design of the slug catcher (volume, and drainage rates) and the operational procedures can be optimised if accurate estimates for liquid volumes in the lines at various flow rates are available. For gas condensate production systems production scenarios as start-ups, production increases, pigging and tail end production must be designed for. Reliable information and measurements of the liquid volumes in other lines in the same parameter range as the line to be designed can be used to tune and verify a predictive multiphase flow model to be used as engineering tool for the line in question. Measurements of liquid volumes in the line, when in operation, can be used to optimise the operations and, thereby improving product quality and production regularity.

Fluids from reservoirs or production facilities will be transported in production pipelines and/or export pipelines to receiving facilities for further refinements. The flow in both the production and the export lines may be multiphase flow. i.e. a gas phase and/or a hydrocarbon liquid phase and/or a water phase and/or solid phases may be transported in the line.

The phases will be transported with different average velocities through the line. Several transport mechanisms for the phases can be seen: transport as liquid film, transport as droplets in the gas or in other liquid phases, transport as liquid slugs or waves, transport of gas as bubbles, transport of particles in the liquid etc. Condensation/evapo-ration/solidification can also occur during transport.

The average velocity of each phase through the line depends on the transport mechanisms seen in the line. The velocities along the line vary with pipeline profile, diameter changes, pressures, temperatures, condensation and rate changes (incoming pipelines in networks). The differences in phase velocities will give different phase volume fractions in the cross sections along the line.

The total phase volumes in the line are directly calculated from the local phase fractions along the line. Due to the complicated transport mechanisms the local phase volume fractions cannot easily be estimated. Simulation tools incorporating multiphase flow models are therefore used to predict the phase fractions along the line, the total volume of the phases in the line, and pressure drops. A standard tool here is the dynamic multiphase code OLGA 2000, but steady state pipe simulators can also be used.

The simulation tools are used as engineering tools for the design and for operational support. The multiphase flow models are based on correlations, which are usually based on small-scale laboratory experiments. Field measurements are thus used to verify the models. Field measurements can also be used to tune the flow models for specific lines. Field measurements of total phase volumes for multiphase lines are very important for verification and tuning of the models.

PRIOR ART

At present, there is only one method available for measuring the liquid phase volume or content in a multiphase line in the petroleum technology industry. The method uses a pig (physical obstacle) to push the liquid out of the line. The liquid volume for the pipeline is calculated based on the measured liquid volume entering the inlet slug catcher (at the pipeline outlet) during the period from start of the pigging operation until the pig arrives at the pipeline outlet.

The transport facility has to be designed for pigging, in order to make this method feasible. It is required that the slug catcher has accurate level measurement devices installed and/or accurate flow meters. For subsea field developments pigging can usually only be performed by introducing the pig from a dedicated rig. Therefore, the cost for the pigging operation will be very large.

Also, in case only a small separator/slug catcher is installed at the pipeline outlet compared to the liquid volume in the line, the liquid collected in front of the pig must be taken gradually into the receiving facility in order not to exceed the liquid handling capacity. This will give lower regularity for the production system, and the cost for measurements of the liquid content at several flow rates may be large or even not feasible.

For many systems the accuracy of the separator/slug catcher level and the flow meters is not sufficient to get reliable measurements of the total liquid phase volumes. It is especially difficult to measure the phase volumes of each of the liquid phases separately, due to the inaccuracy of the level measurement between the liquid phases and/or the inaccuracy of the flow meters. Usually the pigging measurement will at most give reliable measurements of the total liquid content in the line.

Injection of a tracer into a multiphase flow pipeline has not previously been proposed for measuring the phase volumes in multiphase pipelines. It is well known in the industry, however, to measure the volumetric flow rates of the phases in a pipeline, using an injected tracer.

U.S. Pat. No. 5,047,632 and U.S. Pat. No. 5,306,911 describe a method for determining velocities in a multiphase flow in a pipe. The flow is composed of a lighter dispersed-phase and a heavier continuous-phase. A tracer is discharged (or activated) into a flow at a chosen first location in the pipe by mixing (or activating) a portion of the tracer with the continuous-phase. The tracer concentration at a chosen second location in the pipe is measured with a detector as a function of time t, so as to obtain a signal S(t). Then a relationship is fitted to the signal S(t) so as to derive the values of the velocity U of the continuous phase. The slip velocity $v_s$ of the dispersed phase relative to the velocity of the continuous phase, is also advantageously determined. From the values of velocities U and $v_s$ and from the volume fraction $y_1$ of the continuous phase in the pipe (obtained by an ancillary measurement), the volumetric flow rates of the continuous and dispersed phases are determined.

EP 0 167 233 describes a method for determination of the volumetric flow rate of multiphase fluid flows, for example, of the flow of an oil/water mixture in a conduit by means of dilution techniques. A known amount of radioisotopic tracer is injected into at least one of the phases and the concentration of the tracer in the flow is determined at a downstream sampling station, thereby enabling the flow rate of the multiphase flow to be determined. The tracer(s) used should be soluble in only one phase of the fluid flow with the provision that where a plurality of tracers is used, no two or more tracers are soluble in the same phase. Hence, the basic feature of EP 0 167 233 is to use non-partitioning tracers.

It should be emphasized that according to the above identified publications the volumetric flow rates are measured, depending on injection of a non-partitioning tracer into the pipeline.

DESCRIPTION OF THE INVENTION

An objective of the invention is to provide a method for measuring the total phase volumes in pipelines with multiphase flow, in order to
    verify and/or improve the models used for designing the pipeline and the process, and/or
    in order to improve the production process and process economy when the pipeline is in operation.

A second objective of the invention is to provide a method for such measurement where the measurements may be performed without significant impact on ongoing production of oil and/or gas from oil and gas wells, improving the regularity of the production process.

A third objective of the invention is to provide a method for such measurement, allowing the invention to be used even when having condensation/evaporation in the pipeline, using a partitioning tracer.

A further objective is to provide a method for such measurements which minimizes the estimation error due to errors in the assumed hold up distribution.

The invention is characterized in the independent claim, and relates to a method for measuring total phase volumes (hydrocarbon liquid and/or water phase and/or transported solid phases) in multiphase pipelines. It is based on injecting partitioning tracers into the pipeline at the inlet, either directly, if the pipeline is from a topside/onshore facility, via service lines for a pipeline from a subsea installation, and measuring the concentration and the mean time taken from injection until the tracer concentration has stabilized at the measuring point(s).

The partitioning tracers used according to the present invention are of a type which is suitable for use in several phases. In case of a single gas phase, which is relevant for many pipelines, a partitioning tracer only going into the gas phase is introduced at the pipeline inlet.

The tracers are compounds, either radioactive or chemicals, that can be injected and measured in small concentrations. The choice of tracers will depend on the fluid composition and the pressure and temperature profiles in the pipeline. The thermodynamic properties of the tracers must be optimized for these specific conditions in order to minimize measurement error. The tracers should be chosen in such a way that the tracer concentration in the liquid varies as little as possible along the pipeline. This will minimize the estimation error due to errors in the assumed hold up distribution.

The measurements are done for a multiphase pipeline where steady state conditions are reached. During the measurements the flow conditions are kept constant. The principle for the measurement is to measure the equilibrium amount of the tracers in the pipeline at given tracer flow rates. This can be done by injecting a tracer at a constant tracer flow rate at the inlet, starting at a certain time and measuring the tracer concentration at the outlet as a function of time until the equilibrium level is reached. The difference between tracer flow in and out equals the equilibrium amount of tracer in the pipeline. This amount can also be measured using a tracer pulse at the inlet, and measuring the response on the outlet.

In a gas condensate pipeline the inflow can be a single phase gas or the gas may contain a fraction of liquid. Liquid will typically condense out from the gas due to the cooling and the pressure drop as the gas is transported through the pipeline. From the pressure and temperature profiles in the pipeline, which can be computed from a multiphase flow simulator, the steady state liquid and gas flow rates along the line can be computed by thermodynamic equilibrium calculations. The steady state tracer flow rates in the liquid and gaseous phases along the pipeline can also be computed. The equilibrium tracer concentration for a phase only depends on the total flow and total tracer flow rates of the phase and not the detailed transport mechanisms (droplet transport etc). Thermodynamic equilibrium calculations can, therefore, be used to compute the tracer concentrations in the liquid and gas phases.

Having measured the total amount of tracer in the pipeline, we can correct for the amount of tracer in the phases not to be measured by the selected tracer component. Usually the amount of a hydrocarbon tracer in the water phase and the amount of a water tracer in the hydrocarbon phase is very small, and the only correction needed is for the amount of tracers in the gas phase. Using the aforementioned thermodynamic calculations the percentage of tracer in the gas phase can be calculated in order to obtain the amount of tracer in the liquid phase.

Knowing the amount of a tracer in the liquid phase, the total liquid volume could be calculated directly if the tracer concentration in the liquid was a known constant along the line. The tracer concentration in the liquid phase can be computed along the pipeline based on the estimated pressure and temperature profile along the line, the total flow composition and the tracer flow by using a thermodynamic flash calculation (for instance using the computer program PVT-sim).

In general the liquid phase tracer concentration will vary along the line. This means that the measurement not only depends on the total amount of liquid in the pipeline, but also on the distribution of the liquid along the pipeline. In order to minimize the effect of the liquid distribution, it is very important to choose a tracer with thermodynamic properties that makes the tracer concentration as close to a constant along the line as possible.

The tracer measurement of phase volumes requires that there is an injection point for the tracer at the inlet of the multiphase line and at one or more sample points downstream from the point of injection, preferably at least at the outlet of the line, where the tracer concentrations can be measured. For sub-sea systems the tracer can be injected through one of the chemical injection lines. The measurements can be done without interfering with the production. No extra liquid loads compared to normal production will be introduced at the receiving facilities due to the tracer measurement. By introducing several tracer components the volume of all phases in the line can be measured.

The tracer measurement of phase volume is characterized by injection of one or more tracers into the pipeline, preferably at the inlet and by measuring the tracer concentration(s) as a function of time at the point of injection and at one or more points of measurements downstream from the point of injection, and measuring the mean residence time(s) taken for transport of injected tracer to said one or more points of measurements, the liquid phase volume(s) being calculated based on the amount of injected tracers and the measured tracer concentration and the mean residence time.

The tracers comprising one or more partitioning tracers are selected to mimic the transport of the phases to be measured and are injected into the pipeline, the flow preferably being kept constant during measurement, and that the choice of tracer(s) being such that the tracer concentration(s) in the liquid varies as little as possible.

The tracer measurement of volume method can be used regularly for measurements of phase volumes in multiphase lines also when the system is not designed for regular pigging. Also, the method gives the phase volumes for all phases transported in the lines. The measurements do not interfere with normal production, and therefore, can be done without reducing the regularity for the production system.

SHORT DESCRIPTION OF THE FIGURES

Figure 2:
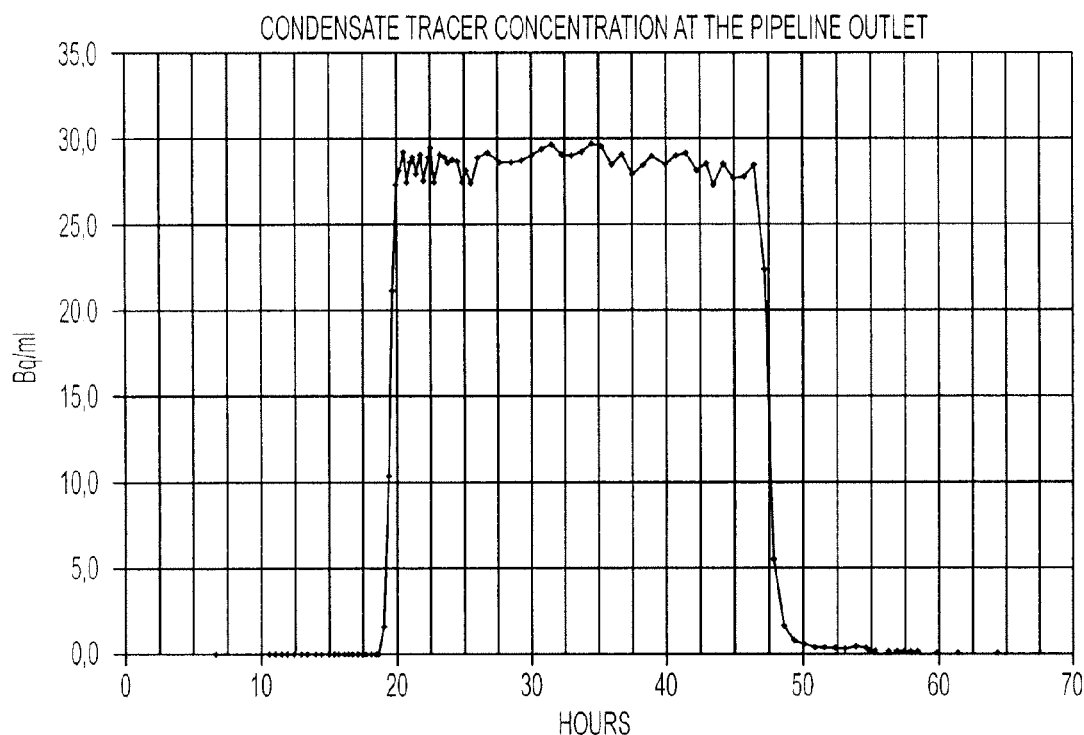

FIG. 1 shows how the relative weight factors for alkane tracers varies along the example application pipeline; while FIG. 2 shows measured condensate tracer condensation for a high production level, given as a function of time.

DESCRIPTION OF AN EXAMPLE APPLICATION

The method has been tested on a gas condensate pipeline in the North Sea. The phase volumes of the condensate and the water/MEG phase were measured separately using tracer measurements.

As explained above, since the liquid condenses out of the gas along the pipeline, it is very important to choose tracers with the optimum thermodynamic properties in order to maximize accuracy of the measurements. What we measure is the mean residence time of the condensate and water/MEG phase tracer separately. Based on the mean residence time and a given tracer injection rate, we can easily compute the total tracer amount in the pipeline at equilibrium. Based on the total tracer amount and the tracer concentrations in the liquid and the gaseous phase, the total liquid phase volume is computed.

The tracers should be selected to fulfil two criteria:

The tracer fraction in the gas should not be too large, since we have to correct for this fraction when estimating the liquid phase volume.

The tracer concentration in the liquid phase should be as close to a constant along the pipeline as possible.

For these tests it was decided to use radioactive tracers, a tritiated alkane for the condensate phase, and either tritiated water or MEG for the aqueous phase. In order to select the best tracers, the pressure and temperature dis-tribution along the pipeline for the measurement conditions were computed using the multiphase pipeline simulator OLGA. Based on the pressure/temperature distribution and the total flow composition (including the possible tracers), the phase flows and the concentration of the possible tracers in the gas and liquid phases are computed using the program PVT-sim.

FIG. 1 shows the relative concentrations of various alkanes along the pipeline. As seen, the relative concentration of octane (C8) is close to constant except for a small part of the pipeline near the inlet. This is an accept-able variation. Tritiated octane was therefore chosen for the condensate tracer. For the aqueous phase, similar computa-tions showed that both tritiated water and MEG were good tracers. Tritiated water was chosen due to price and availability.

The transport line runs between two topside facilities. The tracers could therefore be injected directly at the pipeline inlet using small high-pressure pumps. The tracer solutions (a mix of iso-propanol, tritiated water and tritiated octane, and iodo-benzene) were injected at a rate of 0.5 ml/min. From the start of the experiment the condensate tracer were injected with a constant rate for a period of 21 hours while the water/MEG tracer were injected for a period of 72 hours.

Liquid samples from the pipeline outlet were obtained from a sampling point at regular intervals. The samples were taken at pipeline outlet conditions, i.e. about 100 bar and 7° C., but immediately flashed to atmospheric pressure during sampling. Before the offshore analysis took place, the samples were heated to room temperature, about 20° C. The phases were then separated, filtered and mixed with scintillation fluid before being analyzed with a scintillation counter. In FIG. 2 below the measurement data for the condensate tracer for the high production level are given as a function of time. We see that the condensate tracer moves very nearly as a front through the pipeline. Using these data and the program MATLAB, the mean residence time for the condensate tracer is determined to be 19.6 hours.

Evaluation of Phase Volumes

As mentioned above, the basis for the estimation is the mean residence time T. The mass conservation for each tracer is given by:

$$A \int_0^L (\alpha_l c_l + \alpha_g c_g) dx = \int_0^T (I_0 - I_L(t)) dt = T I_0 \quad (1)$$

where $\alpha_l$ and $\alpha_g$ are holdup of liquid and gas as functions of position x, $c_l$ and $c_g$ are the concentrations of tracer in liquid and gas, respectively (mol/m$^3$), A is the cross sectional area of pipe (m$^2$), $I_0$ is the constant tracer injection flow at pipeline inlet (mol/s), $I_L(t)$ is tracer flow at pipeline outlet (mol/s), and T is the mean residence time of tracer through the pipeline, as computed from the second integral in equation 1.

L is the pipeline length.

Let $V_{lL}$: volume flow of liquid at outlet conditions (m$^3$/s)

$V_l = u_l \alpha_l A$: volume flow of liquid (in position x)

$V_g = u_g \alpha_g A$: volume flow of gas (in position x)

$I_l = c_l u_l \alpha_l A$: tracer flow in liquid (in position x)

$I_g = c_g u_g \alpha_g A$: tracer flow in gas (in position x)

where the u's are the phase velocities in m/s. Then we see that $c_l = I_l/V_l$ and $c_g = I_g/V_g$.

Let $i_l = I_l/I_0$, $v_l = V_l/V_{lL}$, $i_g = I_g/I_0$ and $v_g = V_g/V_{lL}$.

Setting $\alpha_g = 1 - \alpha_l$ and inserting the above relations we can write Eq. (1) as $$\int_0^L \alpha_l \left( \frac{i_l}{v_l} - \frac{i_g}{v_g} \right) dx + \int_0^L \frac{i_g}{v_g} dx = \frac{V_{lL} T}{A} \quad (2)$$

$I_0$ is a given quantity. In the PVT calculations (pressure, volume and temperature calculations) we let the tracer be represented by a small molar fraction of nC8 (normal octane) denoted $\xi_{tot}$.

Then let $M_l$ : molar fraction of liquid
$M_g$ : molar fraction of gas
$\xi_l$ : molar fraction of nC8 in liquid
$\xi_g$ : molar fraction of nC8 in gas.

These quantities can be found by PVT calculations for different positions along the pipeline.

Then we can write $$i_l = M_l \xi_l / \xi_{tot}$$

$$i_g = M_g \xi_g / \xi_{tot} (i_l + i_g = 1.0)$$

Let $\mu_l$ : specific volume of liquid [cm³/mole] and S: total molar flow [mole/s].

Then we can write $$V_l = \mu_l M_l S$$

and $V_{lL} = \mu_{lL} M_{lL} S$ so that $$v_l = \mu_l M_l / \mu_{lL} M_{lL}$$

$$v_g = \mu_g M_g / \mu_{lL} M_{lL}$$

These quantities can also be found by PVT-calculations along the pipeline. To evaluate the first integral in Eq. (2) only the liquid holdup $\alpha_l$ (as a function of x) is now needed. We assume a liquid holdup that is an unknown factor $\lambda$ multiplied by the known holdup distribution from OLGA. In Eq. (2) the outlet liquid flow $V_{lL}$ is assumed to be known (measured), and the transport time T can be calculated from the tracer concentration response at the outlet. Then, we have the following equation for $\lambda$:

$$\lambda = \left( \frac{V_{lL}T}{A} - \int_0^L \frac{i_g}{v_g} dx \right) / \int_0^L \alpha_{lOLGA} \left( \frac{i_l}{v_l} - \frac{i_g}{v_g} \right) dx \quad (3)$$

The accumulated liquid volume is then given by $$V_{l,acc} = \lambda A \int_0^L \alpha_{lOLGA} \, dx$$

where $\alpha_{lOLGA}$ is taken from a corresponding OLGA-simulation.

We select 10 points spread along the pipeline and flash the inlet composition at these 10 pressure/temperature points using PVT-sim. These PVT data are collected in an Excel worksheet where a table of necessary quantities for evaluating the integral in Eq. (3) are calculated. The holdup $\alpha(x)$ in the equation is taken from the OLGA-simulation. A Matlab program is written to evaluate the integral based on the data from the Excel worksheet. The holdup profile from OLGA has a value for each computational section of the pipeline, and the corresponding quantities in the integrand are found by spline interpolation in the 10-points table.

Based on this computational procedure and the mean residence time for the data in FIG. 2 below, the condensate phase volume was computed to be 1115 m³ which corresponds fairly well with the predictions made by OLGA.

The invention claimed is:

1. Method for measurement of total phase volumes in multiphase flow in pipelines, the multiphase fractions comprising gas phase, hydrocarbon liquid phase and/or water phase and/or transported solid phases, characterized by injection of one or more tracers into the pipeline, preferably at the inlet, and by measuring the tracer concentration(s) as a function of time at the point of injection and at one or more points of measurements downstream from the point of injection and by measuring the mean residence time(s) taken for transport of the injected tracer(s) from the point of injection to said one or more points of measurement, the liquid phase volume(s) being calculated based on the amount of injected tracers and the measured tracer concentrations and the mean residence time.

2. Method according to claim 1, wherein one or more partitioning tracers are injected into the pipeline, the flow preferably being kept constant during measurements, and that the choice of tracer(s) being such that the tracer concentration (s) in the liquid varies as little as possible along the pipeline.

3. Method according to claim 1, wherein the tracers are designed to mimic the transport of phases to be measured, the tracers being transported through the line taking into account the effects of condensation, droplet transport in other phases, backward flow, wave transport.

4. Method according to claim 1, wherein the tracers are of a type suitable to entering a gas phase and subsequently condense into the liquid or solid phase downstream of the injection point.

5. Method according to claim 1, wherein the tracer is injected at a controlled rate, that the tracer concentrations are measured at said measuring point, preferably at least at the pipeline outlet and that the phase volumes are calculated based on the amount of injected tracers, the measured tracer concentration in each phase and the mean residence time of the tracer in the pipe.

6. Method according to claim 1, wherein the equilibrium concentration(s) of tracers in the pipeline flow is measured at given tracer flow rates.

7. Method according to claim 6, wherein a tracer is injected at a constant flow rate at the inlet; starting measurement of the tracer concentration in the various phases at the outlet as a function of time, until the equilibrium state is reached, the difference between tracer flow into the pipeline and out of the pipeline being the equilibrium amount of tracer in the pipeline.

8. Method according to claim 6, wherein the equilibrium amount of tracer in the pipeline may be measured by using a tracer pulse on the inlet and measuring the response on the outlet of the pipeline.

9. Method according to claim 1, wherein the measurements are used for tuning multiphase flow models for online and engineering simulators.

* * * * *